Oct. 2, 1951 W. T. ANDERSON, JR 2,569,793
ULTRA-VIOLET IRRADIATION
Filed March 8, 1948 2 Sheets-Sheet 1

INVENTOR
WILLIAM T. ANDERSON, JR.
BY
ATTORNEY

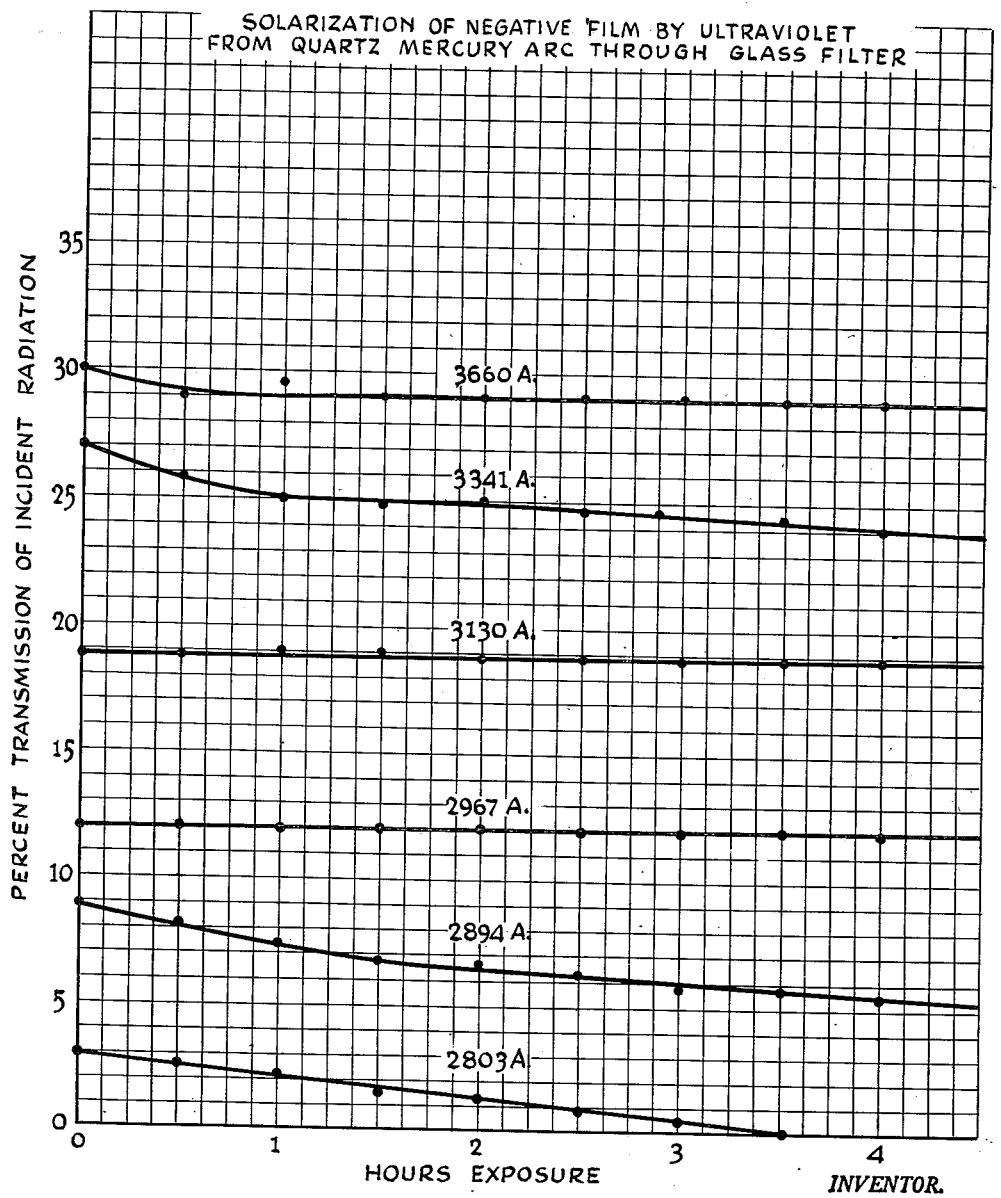

Patented Oct. 2, 1951

2,569,793

UNITED STATES PATENT OFFICE 2,569,793

ULTRAVIOLET IRRADIATION

William T. Anderson, Jr., Maplewood, N. J., assignor to Hanovia Chemical and Mfg. Company, Newark, N. J., a corporation of New Jersey Application March 8, 1948, Serial No. 13,543

3 Claims. (Cl. 250—86)

The present invention relates to ultra-violet irradiation and deals more specifically with ultra-violet irradiation in photochemical processes.

It is well known to use ultra-violet radiations in photochemical processes, e. g., more specifically by way of example, in photoprinting.

In the art of photoprinting, the radiations from an ultra-violet lamp, e. g. a mercury vapor arc discharge device of the high pressure type, are passed through a negative—which may comprise glass, plastic, Celluloid, etc. ultra-violet transparent base material provided with a photosensitive emulsion developed to a permanent negative photographic image of the object photographed, or which may comprise any other suitable image—onto a positive print material provided with a photosensitive emulsion or the like to form thereby the positive image in or on the positive print material.

In photochemical processes, it has been observed frequently that the negative deteriorate in their efficiency to transmit the ultra-violet radiations desired to produce the required reaction in the positive print material. The deterioration, due to solarization, is in many cases of such degree that the negatives affected have such a very short useful life as far as ultra-violet radiation transparency is concerned that photoprinting by means of ultra-violet irradiation is impossible in such cases.

It is one object of this invention to provide means whereby ultra-violet radiations may be used in photoprinting and the like photochemical processes without causing substantial deterioration of the ultra-violet transparency of the negative or other medium interposed between the source of the ultra-violet radiations and the positive print or other material irradiated.

Other objects and advantages of this invention will become apparent from the description thereof hereinafter following.

Figure 1:
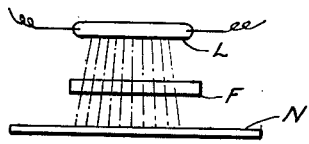
Figure 1:
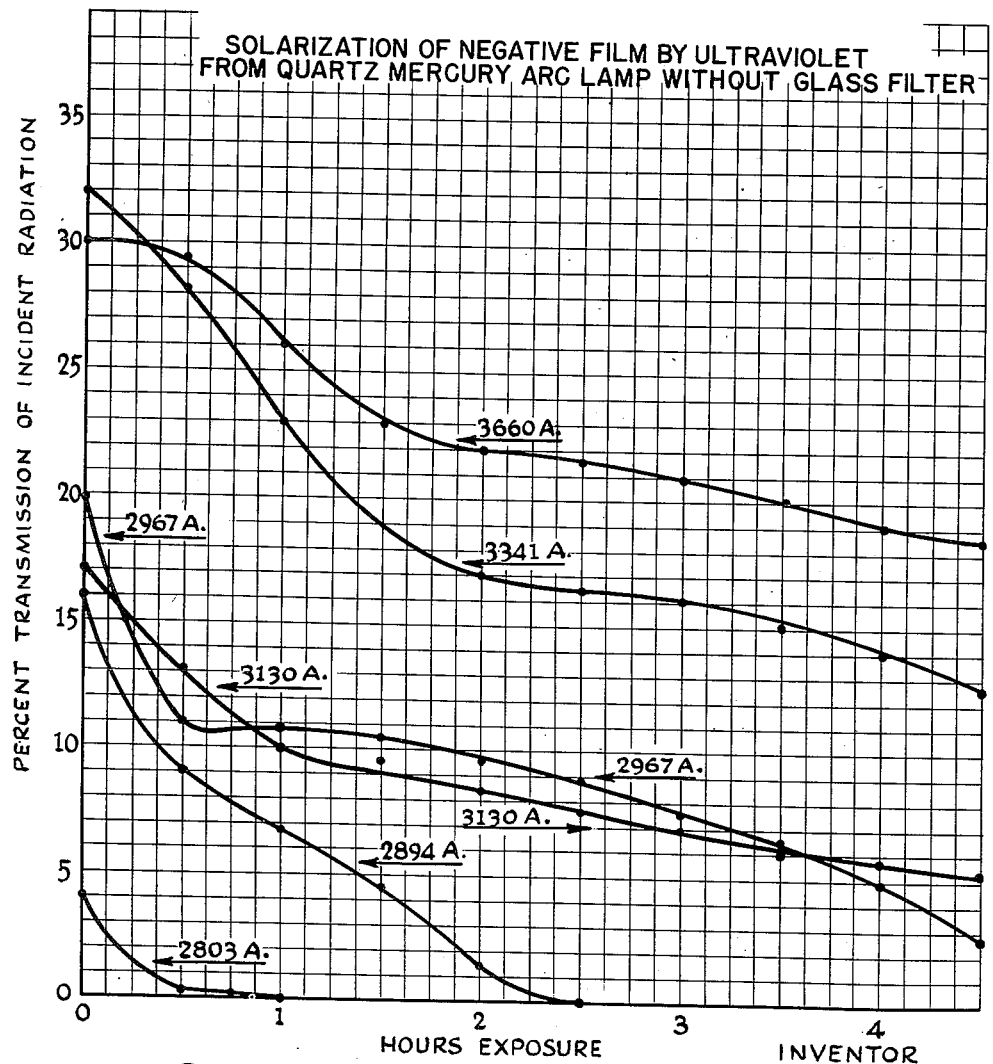

Figure 1 shows a graphic representation of the solarization condition in a negative film, Figure 2 is a graphical illustration illustrating the effect upon the solarization condition of the use of the photoprinting combination of the invention, and Figure 3 is a diagrammatic showing of the relationship between the elements of the photoprinting combination.

My invention provides a method of ultra-violet irradiation of photosensitive material through a negative or the like material in such manner that solarization of the interposed negative and consequent deterioration of its ability to transmit the ultra-violet radiations desired for producing the photochemical effect in the positive irradiated are substantially avoided.

I have discovered that I can prevent this solarization and deterioration of the transmission efficiency by substantially limiting the radiations incident upon the solarization—sensitive negative material to radiations substantially devoid of or poor in radiations between about 2300 to 2900 angstrom units and concentrating the radiations impinging upon and transmitted through such negative material to the radiations of about 2900 to 4000 angstrom units by means of a filter adapted to absorb and retain radiations below 2900 angstrom units and transmit radiations above 2900 angstrom units.

Generally speaking, the art has strived to provide for ultra-violet irradiation devices, glass envelopes highly efficient in the transmission of the radiations in the range of 2537 to 4000 angstrom units, which while highly efficient in the transmission of ultra-violet radiations are thus also very efficient in causing solarization of solarization-sensitive negatives.

In order to remedy the detrimental effects of the solarization range, I have provided glass filters which transmit highly the advantageous ultra-violet radiations 2900–4000 angstrom units and which are practically opaque to radiations of wavelengths shorter than 2900 angstroms. I propose to use such filters as a window over a photographic negative or as the envelope of the ultra-violet lamp or carbon arc lamp so that useful radiations are obtained substantially without radiations which cause solarization or other undesired reactions. In Figure 3 these elements are diagrammatically shown as lamp L and photographic negative element N with a filter F interposed therebetween.

The filter according to the invention is provided by adding to the ultra-violet transmitting glasses or fused quartz very small measured quantities of titanium or iron oxides. The ultra-violet transmitting medium, the transmitting properties of which are to be altered, must be in a molten condition and in a graphite crucible so that the percentage addition of the critical substances may be controlled more accurately without the possibility of the medium picking up substances from its container, such as might occur with the use of a clay crucible or the like. If titanium oxide is to be added, sufficient must be added and thoroughly mixed so that a final glass or fused quartz composition will contain between less than 0.1 percent to more than 0.01 percent and preferably between 0.030 percent and 0.015 percent of titanium oxide by weight. If ferric oxide is used, sufficient must be added and thoroughly mixed so that the final product contains between less than 0.1 percent to more than 0.01 percent and preferably between 0.025 percent and 0.015 percent ferric oxide by weight. When fused quartz is to be treated, it is practical to admix the oxides with the unfused quartz prior to the production of fused quartz. It is possible to obtain the same advantageous results by proportionate combinations of the two abovementioned metals.

A typical phosphate transmitting glass formula, including the percentage composition, as modified by the addition of a titanium oxide is:

|  | Percent by weight |
|---|---|
| $K_2O$ | 12.3 |
| MgO | 7.6 |
| BaO | 2.5 |
| CaO | 5.1 |
| $B_2O_3$ | 17.0 |
| $Al_2O_3$ | 29.1 |
| $P_2O_5$ | 26.4 |
| $TiO_2$ | 0.02 |

Where a ferric oxide is to be added the titanium oxide may be substituted by the iron oxide.

Such phosphate glass as abovementioned, without the addition of, for example, the titanium or iron oxides, was examined for ultra-violet transmission. For a thickness of one millimeter, the following ultra-violet transmission was measured:

| Wavelength in Angstroms | Per cent incident radiations transmitted |
|---|---|
| 3,130 | 70 |
| 2,967 | 63 |
| 2,803 | 60 |
| 2,537 | 51 |

After the glass had been melted in a graphite crucible, titanium oxide in the specified proportions was added, the glass was formed and again adjusted to a thickness of one millimeter. The following ultra-violet transmission was measured:

| Wavelength in Angstroms | Per cent incident radiations transmitted |
|---|---|
| 3,130 | 67 |
| 2,967 | 35 |
| 2,803 | trace |
| 2,537 | trace |

The above measured comparative transmissions between the phosphate glass without the titanium oxide and the phosphate glass with titanium oxide shows the attainment of nearly all the useful light of the unmodified glass in the wavelength greater than 3000 angstroms with a very great reduction in the intensity of the radiations shorter than 3000 angstroms which may cause solarization and otherwise not wanted radiations.

For illustrative purposes, Figure 1 shows a graphic representation of the solarization condition in a negative film used for reproduction by ultra-violet irradiation. The source of irradiation is a quartz mercury arc lamp without the use of the filter hereinbefore described. The percent transmission of incident radiation is given for various wavelengths over a given period of time. The solarization curves as shown indicate that at a wavelength of 3660 angstroms the initial transmission is 30% of the incident radiation and decreases progressively after three hours to about 21% due to opaqueness brought about by the solarization.

Typical wavelengths shown indicate solarization as follows:

| Wavelength A | Approx. Per cent initial transmission of incident radiation | Time Exposure, hours | Approx. Per cent transmission after time exposure |
|---|---|---|---|
| 3,660 | 30 | 3 | 21 |
| 3,341 | 32 | 3 | 16 |
| 3,130 | 17 | 3 | 7 |
| 2,967 | 20 | 3 | 7.5 |
| 2,894 | 16 | 2 | 1.5 |
| 2,803 | 4 | 1 | 0 |

Since it had been established that wavelengths between 3000 and 4000 angstrom units produce very little solarization, it is apparent that most of the decrease in transmission shown must be caused by exposure to radiations shorter than 3000 angstrom units.

The filter glass according to this invention, as hereinbefore measured, shows a 67 percent incident radiation transmission at 3130 angstroms or generally, above 50 percent for wavelengths longer than 3000 angstroms. However, in addition to such incident radiation transmission, the filter substantially eliminates transmission below approximately 2900 angstroms and greatly reduces the solarization effect.

Figure 2 is a graphical illustration showing the advantages of the filter of the present invention and more particularly the advantages obtained in comparison with Figure 1.

The source of irradiation is a quartz mercury arc lamp with the use of the filter hereinbefore described. The percent transmission of incident radiations is given for various wavelengths over a given period of time. The solarization curves as shown indicate that at a wavelength of 3600 angstroms the initial transmission is 30% of the incident radiation and decreases after three hours to only approximately 29% due to the substantial absence of the shorter wavelengths which produce the solarization conditions.

The typical wavelengths shown indicate solarization as follows:

| Wavelength A | Approx. Per cent initial transmission of incident radiation | Time Exposure, hours | Approx. Per cent transmission after time exposure |
|---|---|---|---|
| 3,660 | 30 | 3 | 29 |
| 3,341 | 27 | 3 | 24.5 |
| 3,130 | 18.8 | 3 | 18.8 |
| 2,967 | 12 | 3 | 12 |
| 2,894 | 9 | 2 | 6.5 |
| 2,803 | 3 | 1 | 2.2 |

In comparing the percent transmission of the various wavelengths with the filter to the percent transmission without the filter, it will become obvious that the solarization condition is practically eliminated and greater transparency is obtained. Moreover, the transmission of wavelengths shorter than 2900 angstroms is less than 10 percent of this incident ultra-violet radiations. The useful life of a photographic negative irradiated through such filter is, therefore, greatly enhanced and duplication by such negative is greatly improved for ultraviolet applications.

Although the use of the filter is particularly advantageous for ultra-violet photoprinting, it may also be employed to advantage as an envelope or window through which various solutions and gases, etc., may be irradiated. Where used as an envelope, the filter glass is prepared as hereinbefore described and then formed to any envelope specifications desired. For example, the filter glass may be formed as an envelope on an ultra-violet radiation source, such as a mercury arc lamp or carbon arc lamp. In such case, no auxiliary filter means are necessary to obtain the beneficial results of the invention.

The invention, therefore, makes it possible to obtain useful radiations for various photochemical processes and to substantially eliminate by filtration radiations which cause solarization and other undesired reactions.

What I claim is:

1. A photoprinting combination consisting of an ultraviolet irradiation lamp source capable of transmitting radiations in the range of 2537 to 4000 angstrom units, a sensitized surface photoprinting negative element subject to destructive solarization by ultraviolet radiations from said lamp in the range of 2537 to 2900 angstrom units, and a phosphate glass filter opaque to radiations in the range of 2537 to 2900 angstrom units interposed therebetween containing an oxide taken from the group consisting of titanium oxide and ferric oxide, said oxide constituting from 0.01% to 0.1% by weight of said glass, whereby destructive solarization of the photoprinting negative element is prevented by the elimination of the transmission thereto of irradiations within the destructive solarization range.

2. The photoprinting combination of claim 1 wherein the filter contains $TiO_2$ in the amount of from 0.015% to 0.030% by weight.

3. The photoprinting combination of claim 1 wherein the filter is of fused quartz and contains $TiO_2$ in the amount of from 0.015% to 0.030% by weight.

WILLIAM T. ANDERSON, Jr.

REFERENCES CITED

The following references are of record in the file of this patent:

UNITED STATES PATENTS

| Number | Name | Date |
|---|---|---|
| 1,749,823 | Long | Mar. 11, 1930 |
| 2,308,130 | Meister et al. | Jan. 12, 1943 |
| 2,381,925 | Pincus | Aug. 14, 1945 |
| 2,430,539 | Kuan | Nov. 11, 1947 |

FOREIGN PATENTS

| Number | Country | Date |
|---|---|---|
| 263,410 | Great Britain | 1926 |
| 424,366 | Great Britain | 1935 |

OTHER REFERENCES

"Glass Color Filters," published by Corning Glass Works, Corning, New York. Catalogue C112 received in the Patent Office on February 5, 1937. Page 11.